(12) United States Patent
Pattillo

(10) Patent No.: US 12,397,207 B1
(45) Date of Patent: Aug. 26, 2025

(54) GOLF BAG MOUNTED ROLLING TRANSPORT BASE

(71) Applicant: Kimberly A. Pattillo, Punta Gorda, FL (US)

(72) Inventor: Kimberly A. Pattillo, Punta Gorda, FL (US)

( * ) Notice: Subject to any disclaimer, the term of this patent is extended or adjusted under 35 U.S.C. 154(b) by 318 days.

(21) Appl. No.: 18/109,599

(22) Filed: Feb. 14, 2023

(51) Int. Cl.
*A63B 55/30* (2015.01)
*B62B 5/00* (2006.01)

(52) U.S. Cl.
CPC ............ *A63B 55/30* (2015.10); *B62B 5/0083* (2013.01); *B62B 2202/406* (2013.01)

(58) Field of Classification Search
CPC ........... A63B 55/30; A63B 55/60; A45C 5/14; A45C 5/143; A45C 2005/148; B62B 5/0083; B62B 2301/254; B62B 2301/34; B62B 2202/406; B62B 2202/404; Y10S 280/06; B60R 2019/002; B60R 19/54; B60S 1/68
See application file for complete search history.

(56) References Cited

U.S. PATENT DOCUMENTS

| | | | | |
|---|---|---|---|---|
| 646,869 A * | 4/1900 | Perkes | ................... | A63B 55/57 280/DIG. 6 |
| 2,590,154 A * | 3/1952 | Burns | ..................... | B62B 1/262 280/DIG. 6 |
| 2,957,700 A * | 10/1960 | Beaurline | ............... | B62B 1/262 280/DIG. 6 |
| 5,524,913 A * | 6/1996 | Kulbeck | ................. | A63C 17/06 280/11.208 |
| 6,279,926 B1 * | 8/2001 | Taube | ................... | B62B 5/0083 280/37 |
| 6,334,630 B1 * | 1/2002 | Barros, Sr. | ................ | B60S 1/68 15/256.5 |
| 7,229,082 B1 | 6/2007 | Wilmarth | | |
| 9,681,717 B2 * | 6/2017 | Meersschaert | ........... | A45C 5/14 |
| 9,981,619 B1 * | 5/2018 | Deng | ...................... | B60R 19/00 |
| 10,610,750 B2 * | 4/2020 | O'Keefe | ................ | A63B 55/30 |
| 11,701,941 B2 * | 7/2023 | Kim | .................... | B60B 33/0018 16/45 |
| 11,970,313 B2 * | 4/2024 | Morris | ................. | B65D 43/164 |

(Continued)

FOREIGN PATENT DOCUMENTS

KR 200492167 Y1 * 8/2020

*Primary Examiner* — Steve Clemmons
(74) *Attorney, Agent, or Firm* — Sanchelima & Associates, P.A.; Jesus Sanchelima; Christian Sanchelima

(57) ABSTRACT

A golf bag mounted rolling transport base including a bag assembly joined to a base assembly and a roller assembly attached to a bottom of the base assembly. The golf bag assembly includes a golf bag member with a handle at a top portion thereof. The base assembly includes a base member with a cylindrical shape on a bottom of the golf bag member. The golf bag member is joined with the base member where the base member includes an axle attached thereof by means of screws along an exterior contour of the base. The roller assembly includes a roll member placed on a bottom portion of the base member which is configured to tip and roll the golf bag member for mobility, wherein a debris scraper is placed at a bottom side of the base member to prevent the roller member from being stuck due to debris while rolling.

1 Claim, 4 Drawing Sheets

(56) References Cited

U.S. PATENT DOCUMENTS

| | | | |
|---|---|---|---|
| 2003/0030240 A1* | 2/2003 | Wang | B62B 5/0083 |
| | | | 280/47.315 |
| 2007/0039794 A1* | 2/2007 | Hwang | A63B 55/30 |
| | | | 280/DIG. 6 |
| 2007/0252353 A1* | 11/2007 | Sokol | A63B 55/60 |
| | | | 280/47.26 |
| 2022/0037960 A1* | 2/2022 | Curescu | H02K 7/1846 |
| 2022/0295956 A1* | 9/2022 | Steiner | B62B 1/18 |

* cited by examiner

GOLF BAG MOUNTED ROLLING TRANSPORT BASE

II. BACKGROUND OF THE INVENTION

1. Field of the Invention

The present invention relates to golf bag mounted rolling transport base and, more particularly, to a golf bag mounted rolling transport that includes a wheeled base consisting of an elongated cylindrical roll located on the base of a golf bag.

2. Description of the Related Art

Several designs for a golf bag mounted rolling transport base have been designed in the past. None of them, however, include a golf bag mounted rolling transport base wherein a cylindrical roll is used as a wheeled base that allows the bag to be pulled over multiple surface terrains.

Applicant believes that a related reference corresponds to U.S. Pat. No. 10,610,750 issued for disclosing a roller wheel which can be attached and detached from the bottom of the golf bag. Applicant believes that another related reference corresponds to U.S. Pat. No. 7,229,082 issued for disclosing a detachable wheeled support base for the bottom of a golf bag. None of these references, however, teach of an elongated cylindrical roll which is located on one side of the base so that the bag is tilted onto the roller and can be pulled over multiple surface terrains.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a bottom portion with a cylinder roller that allows free mobility of the golf bag for multiple surfaces.

It is another object of this invention to eliminate the need to carry the heavy golf bag.

It is still another object of the present invention to assist a person with moving a golf bag without having to use the carrying strap on the bag.

It is yet another object of this invention to provide a device that saves time, effort and is easy to use and maneuver.

Further objects of the invention will be brought out in the following part of the specification, wherein detailed description is for the purpose of fully disclosing the invention without placing limitations thereon.

IV. BRIEF DESCRIPTION OF THE DRAWINGS

Figure 1:
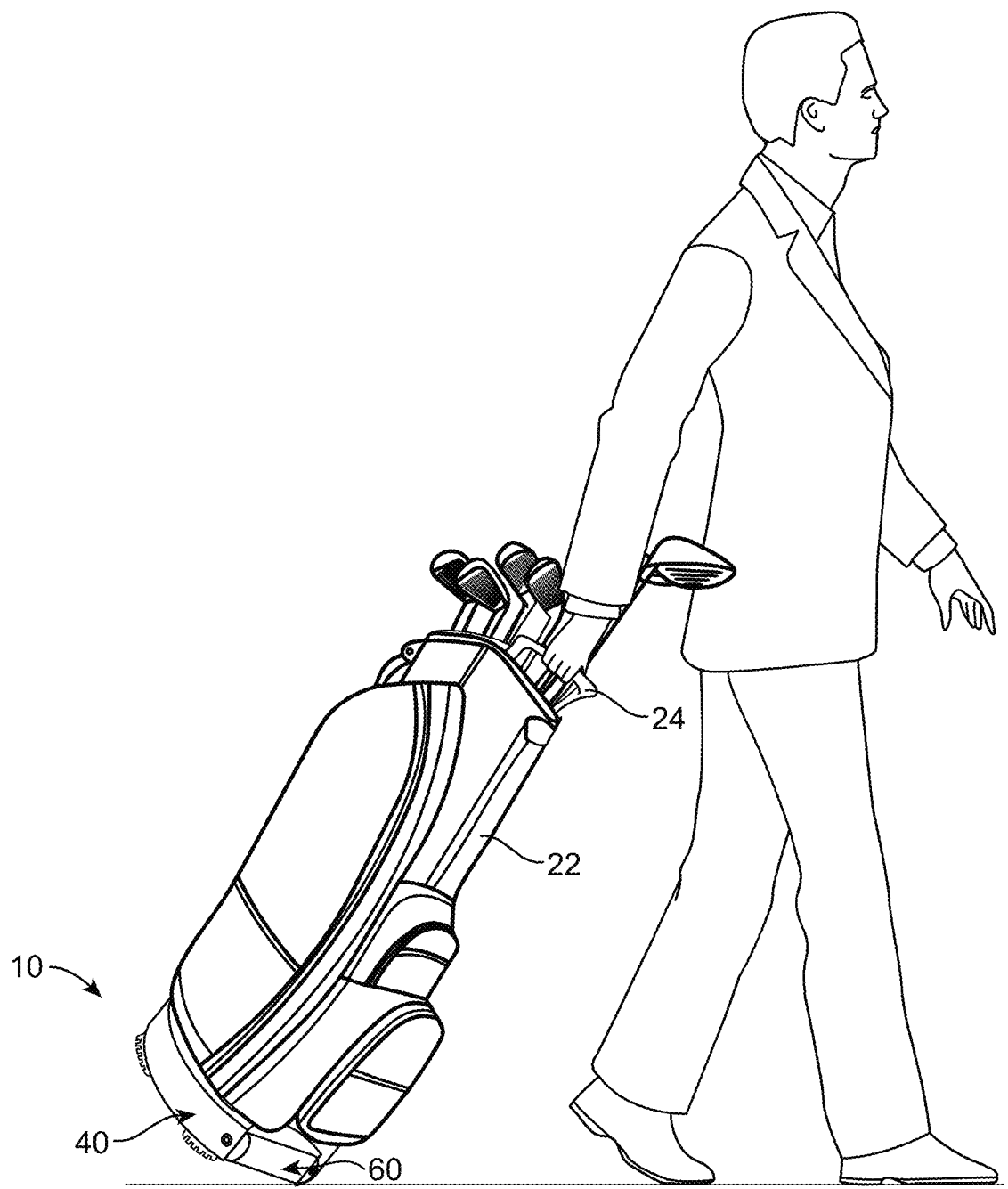

With the above and other related objects in view, the invention consists in the details of construction and combination of parts as will be more fully understood from the following description, when read in conjunction with the accompanying drawings in which:

FIG. 1 represents an operational view wherein a user is shown pulling the present invention 10. A golf bag assembly 20 mounted in a base assembly 40 which contains a roller assembly 60.

Figure 2:
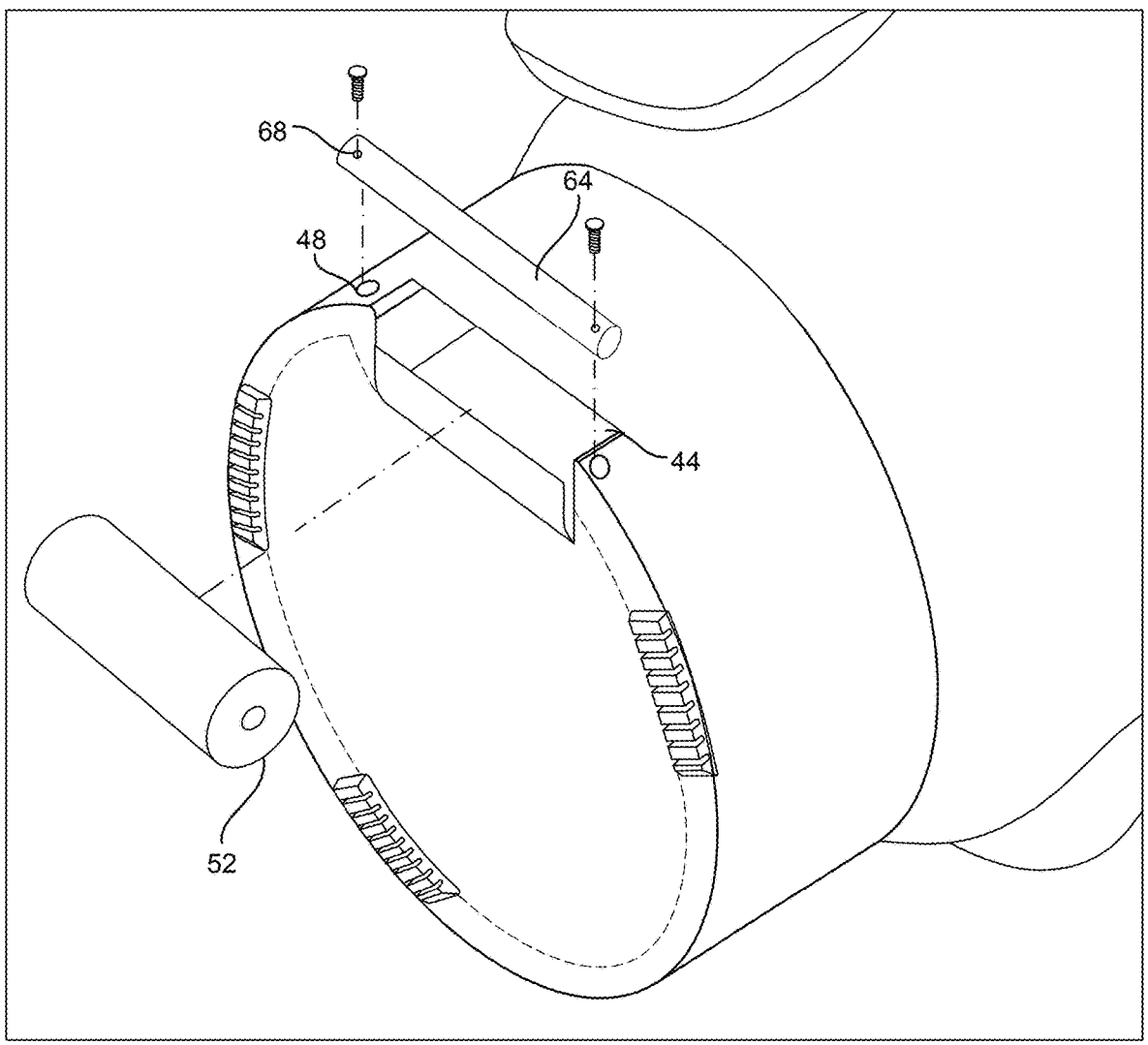

FIG. 2 shows a top isometric view of a base member 42. The base member 42 has a roller portion 44.

Figure 3:
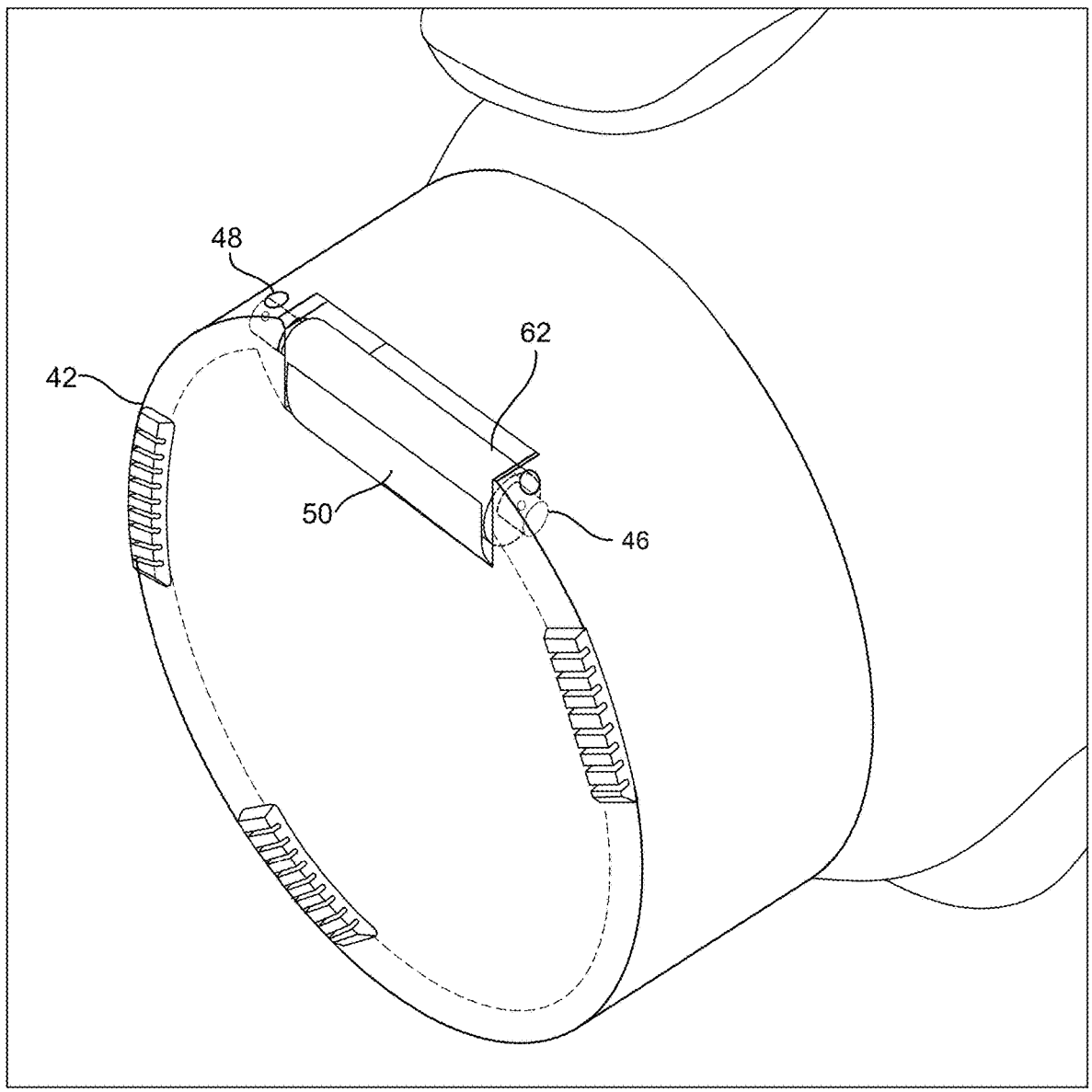

FIG. 3 illustrates a bottom isometric view of the base member 42, an axle 64 and the debris scraper 50. The axle 64 is inserted along the roller portion 44.

Figure 4:
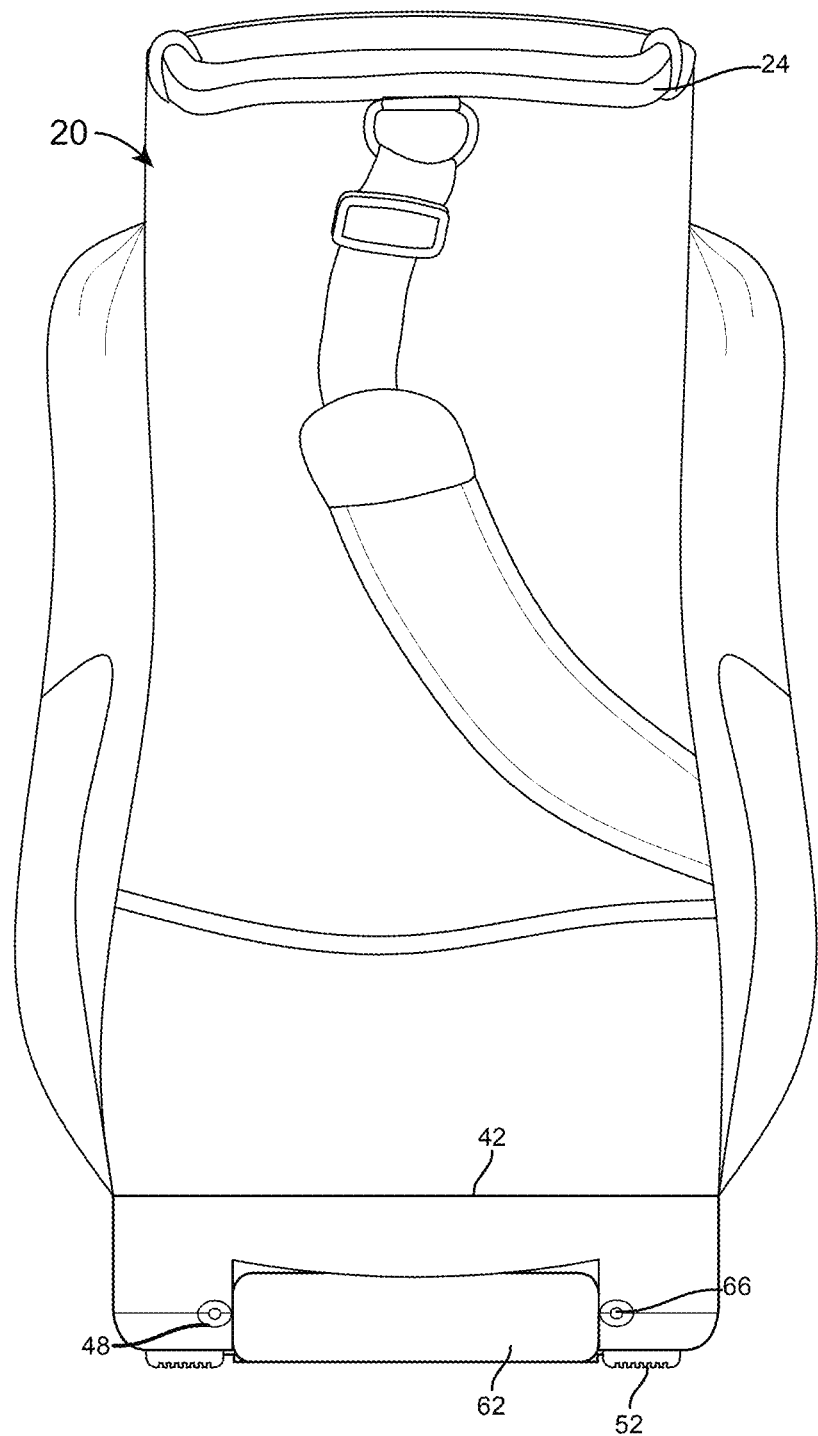

FIG. 4 is a representation of a front side view of the base member 42. A roller 62 is attached to the base 42 along the roller portion 44 by screws 66.

V. DETAILED DESCRIPTION OF THE EMBODIMENTS OF THE INVENTION

Referring now to the drawings, where the present invention is generally referred to with numeral 10, it can be observed that it basically includes a bag assembly 20, a base assembly 40 and a roller assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The golf bag assembly 20 includes a golf bag member 22 and a handle 24. In a preferred embodiment, the golf bag member 22 may be suitable to be transported by the base assembly 40 in cooperation with the roller assembly 60. It is to be understood that the golf bag assembly 20, the base assembly 40 may be joined by industrial glue or any other manufacturing cement or glue. Nevertheless, other means like rivets may be suitable to connect a bottom portion of the golf bag assembly 20 to a top portion of the base assembly 40 while the roller assembly 60 may be mounted on the base assembly 40 by any means like screws, fasteners or the like. In one embodiment, the golf bag member 22 may be made of nylon, canvas or leather including plastic or metal framing as known the art. The golf bag member 22 as known in the art may be configured to store golf clubs thereof wherein the golf bag member 22 may be able to transport the golf clubs or any other golf item configured to be stored within the golf bag member 22 by the base assembly 40 in cooperation with the roller assembly 60. In a preferred embodiment, the golf bag member 22 may be suitable to include the handle 24 mounted on a rear top portion thereof as best observed in FIG. 1 and FIG. 4, it is to be considered that the roller assembly 40 may be coplanar relative to the handle 24 wherein each of both are placed on a rear portion of the golf bag member 22.

As best observed in FIG. 1, the golf bag member is being transported by a user with the cooperation of the roller assembly 60. The handle 24 as known in the art may be configured to allow the golf bag member 22 to be pulled, considering the placement thereof relative to the roller assembly 60. In one embodiment, the handle assembly 24 may be made of a plastic material or any other variation thereof. Nevertheless, in other embodiments, the handle 24 may be made of metal, steel, wood, or any other suitable and durable material. It may be considered that the handle 24 may be configured to allow the base assembly 40 to roll when being pulled.

The base assembly 40 includes a base member 42, a roller portion 44, inner openings 46, openings 48 and a debris scraper 50. In a preferred embodiment, the base member 42 may be configured to tip and roll the golf bag member 22 for mobility. In another embodiment, the base member 42 may eliminate the need for a user to constantly carry the golf bag member 22 The base member 42 may be located on a bottom portion of the golf bag member 22 adhered by manufacturing means. In another embodiment, the base member 42 may permit standing up the golf bag member 22. As best observed in FIG. 2 in a suitable embodiment base member 42 may have a circular hollow shape. It is to be understood that any other shape like square shape, triangular shape, hexagonal shape, octagonal shape, or any other variation may be suitable for base member 42. The base member 42 may be made of a rigid plastic material. Nevertheless, in other embodiments, the base member 42 may be made of a metal material, wood material, galvanized steel material, zinc alloys material, or any other variation thereof. In other embodiment, base member 42 may include a triangular configuration of three luggage feet well known in prior art, wherein roller member 62 is located between two of the three feet. It should be considered that the base member 42 may include a plurality of feet that allows the golf bag member 22 to stand.

In a preferred embodiment, the base member 42 may include the roller portion 44 placed along an exterior side thereof as best observed in FIG. 2, wherein the roller portion 42 may further be configured to set the roller assembly 60. The roller portion 44 may be suitable to have a shape that conforms with the shape of the roller assembly 40. It is to be considered that the roller portion 44 may be suitable to be made of a material from which the base member 42 may be made of. The roller portion 44 may be configured to allow the base member 42 to be transportable when attaching the roller assembly within the roller portion 44 which may have a hollow body. The openings 48 may be suitable to be placed on each distal end thereof as best observed in FIG. 2 to insert fasteners and secure the roller assembly 60. In a preferred embodiment, the openings 48 may be suitable to have a circular shape to conform with commercial fasteners. The inner openings 46 in a preferred embodiment may be suitable to be placed in an inner portion of the base member 42, considering that one of the inner openings 46 is related to the roller portion 44 by a distal end thereof, and another of the inner openings 46 is related to another distal end of the roller portion 44. The inner openings 46 may be perpendicularly placed relative to the openings 48, wherein each of the inner openings 46 may be configured to insert the roller assembly 40 and be secured with fasteners.

In other embodiment, FIG. 2 depicts the debris scraper that extends past the roller portion 44 with a curved shape. The debris scraper is attached or integrally formed into the base member 42, wherein the debris scraper 50 protrudes from the bottom circumference of the roller portion 44 conforming with the curved circumference of the roller member 62 until a portion of said circumference, allowing the roller member 62 to roll when the bag assembly 20 is slanted. In a preferred embodiment, the debris scraper 50 may have a suitable gap with respect to the roller member 62, said gap allows the roller member 62 to roll while the debris scraper prevents debris from passing into the roller portion 44. As best depicted in FIG. 3. In a suitable embodiment, the debris scraper 50 may have a suitable height with respect to the horizontal plane of the base member 42, allowing the golf bag member 22 to stand by means of the plurality of feet. As FIG. 4 represents.

The roller assembly 60 includes a roller member 62, the axle 64, screws 66, and threaded holes 68. In a preferred embodiment, the roller member 62 may be attached to the roller portion 44 wherein the roller member 62 may have a cylindrical body which may be suitable to conform with the roller portion 44. In a suitable embodiment, the roller member 62 may be suitable to be made of a rigid plastic material. In a preferred embodiment, the roller member 62 may be mounted on the axle 64 within the roller portion 44. The axle 64 may be suitable to be attached by distal ends thereof wherein each of the distal ends of the axle 64 may have each of the threaded holes 68 which concentrically may be place related with the openings 48. It may be considered that the openings 48 may be related with the base member 42 by an exterior surface while the threaded holes 68 may be related with the roller member 62. The axle 64 is secured by the screws 66 wherein each of the screws 66 may be inserted to each of the openings 48 passing through the threaded holes 68 when each of the openings are concentrically placed with each of the threaded holes 68. It may be considered that the axle 64 may be made of a steel material or any material capable of withstanding heavy loads. The axle 64 may be suitable to have a cylindrical shape that conforms with the roller member 42. The screws 66 may be any type of fastener suitable for insert within the openings 48.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A golf bag mounted rolling transport base consisting of:
a golf bag assembly including a golf bag member having a handle on a rear top portion thereof to further roll a roller member from a roller assembly;
a base assembly including a base member, said base member includes a roller portion in a side thereof which conforms with a periphery of said base member, said roller portion include inner openings and openings, wherein said inner openings are formed along an interior of said base member, wherein said openings are formed along an exterior of said base member,
wherein at least one of said inner openings is placed in a distal end relative said roller portion in a parallel configuration, said openings are placed proximal the endings of said roller portion being perpendicular relative to said inner openings, said base member includes a debris scraper proximal to a circumference of said roller member, said debris scraper has a curved shape, wherein said curved shape of said debris scraper conforms with a shape of said roller member, said debris scraper has a gap with respect to said roller member, allowing said roller member to roll while said debris scraper prevents debris from passing into said roller portion; and
wherein said roller member is mounted to an axle along said roller portion, said roller member and said axle are coplanar relative said handle, said axle is located between said distal endings of said roller portion, said axle has threaded openings being perpendicular relative to said inner openings, said axle is attached to said roller portion by distal ends thereof attached to said inner openings of said roller portion, said axle and roller are attached by screws inserted into each of the openings of said base member to allow transporting said golf bag assembly over multiple surfaces by pulling said golf bag member by said handle, said base member, said golf bag member and said base member are manufactured to be one item.

* * * * *